United States Patent [19]
Inoue

[11] Patent Number: 5,820,891
[45] Date of Patent: Oct. 13, 1998

[54] APPARATUS FOR MAKING OPTICAL DISK SUBSTRATES

[75] Inventor: Kazuo Inoue, Osaka, Japan

[73] Assignee: Matsushita Electric Industrial Co., Ltd., Osaka, Japan

[21] Appl. No.: 893,688

[22] Filed: Jul. 14, 1997

Related U.S. Application Data

[62] Division of Ser. No. 756,798, Nov. 26, 1996, Pat. No. 5,705,105, which is a division of Ser. No. 491,587, Jun. 16, 1995, Pat. No. 5,683,630.

[30] Foreign Application Priority Data

Jun. 20, 1994 [JP] Japan .................................. 6-13986

[51] Int. Cl.$^6$ .......................... B29C 45/76; B29C 45/77
[52] U.S. Cl. ........................ 425/143; 425/143; 425/149; 425/150; 425/562; 425/575; 425/590
[58] Field of Search .................................. 525/149, 150, 525/143, 562, 589, 590, 810, 145, 575; 264/1.33, 2.2, 107

[56] References Cited

U.S. PATENT DOCUMENTS

| 4,772,196 | 9/1988 | Asai .................................. 425/810 |
| 4,849,151 | 7/1989 | Tamura et al. ...................... 264/328.1 |
| 4,986,938 | 1/1991 | Izuka et al. ......................... 264/328.7 |
| 5,002,706 | 3/1991 | Yamashita ............................. 264/2.2 |
| 5,044,925 | 9/1991 | Watanabe ............................ 264/328.7 |
| 5,130,075 | 7/1992 | Hara et al. .............................. 264/2.2 |
| 5,296,174 | 3/1994 | Yakemoto et al. ..................... 425/149 |
| 5,417,899 | 5/1995 | Kitamura .............................. 264/40.5 |
| 5,451,363 | 9/1995 | Minamimura et al. .............. 264/328.7 |
| 5,552,094 | 9/1996 | Kubota ................................... 264/2.2 |

FOREIGN PATENT DOCUMENTS

| 5-205323 | 8/1993 | Japan . |
| 5-205324 | 8/1993 | Japan . |
| 5-212756 | 8/1993 | Japan . |

OTHER PUBLICATIONS

Rosato et al., Injection Molding Handbook, published by Van Nostrant Reinhold Company of New York, pp. 103–105 and 170–172 (196).

Primary Examiner—Khanh P. Nguyen
Attorney, Agent, or Firm—Morrison & Foerster LLP

[57] ABSTRACT

A molding apparatus produces high-density thin type optical disk substrates having good replicability and birefringence sufficient for practical use. In filling the resin into the cavity, the stress on the resin is reduced by controlling the relation of the cavity width and the injection compression force to reduce birefringence. Further, the mirror surface of the mold is maintained at a certain temperature to facilitate the resin flow and a good replicability and reduction of birefringence is achieved by terminating the resin filling and starting the compression process at the time at which the pressure of the resin filling is at a minimum.

5 Claims, 6 Drawing Sheets

APPARATUS FOR MAKING OPTICAL DISK SUBSTRATES

This application is a division of application Ser. No. 08/756,798, filed Nov. 26, 1996, now U.S. Pat. No. 5,705,108, which is a division of application Ser. No. 08/491,587 filed Jun. 16, 1995.

FIELD OF THE INVENTION

This invention relates to a process for producing an optical disk substrate, and to an apparatus for making optical disk substrates.

BACKGROUND OF THE INVENTION

Recently, optical disks are receiving attention as memory media capable of recording a large capacity and operating at a high speed. Examples of optical disks include disks only for reproduction such as CD, VD and CD-ROM, and disks for both recording and reproduction such as write-once types, erasable writing and reproduction disks such as rewritable types. As substrates of such optical disks, resin substrates such as polycarbonate resins, acryl resins, polyolefine resins are commonly used.

Such disk substrates are commonly formed by injection molding or injection-compression molding in consideration of productivity. That is, by injecting a melted resin material into the cavity formed between a clamped stable mold and a movable mold having a flat circular stamper therein, a flat disk substrate having pits and grooves replicated from the surface of the stamper can be formed.

Molding machines can be classified into two types, namely, straight hydraulic type and toggle type. These types of molding machines are illustrated in "Plastic Technology Handbook" written by Yujiro Sakurauchi published from Institute for Industrial Research in 1993. FIGS. 7($a$) and 7($b$) are diagrams of the mechanical structures of these machines.

FIG. 7($a$) illustrates a straight hydraulic type structure. Numeral 101 is a stable mold which is attached to a large plate 103 with bolts. Numeral 102 is a movable mold which is attached to a large plate 104 with bolts. The movable mold 102 can interfit or part with the stable mold 101 by being parallelly moved with piston 107 driven by hydraulic circuit 106 and guided with tie bars 105 which are installed on the large plate 104. In this case, clamping and the clamping pressure between the stable mold 101 and the movable mold 102 are adjusted by means of the hydraulic circuit 106.

FIG. 7($b$) illustrates a toggle type structure. Numeral 101 is a stable mold which is attached to a large plate 103 with bolts. Numeral 102 is a movable mold which is attached to a large plate 104 with bolts. The movable mold 102 can interfit or part with the stable mold 101 by being parallelly moved by toggle 110 and piston 109 driven by hydraulic circuit 108 and guided with tie bars 105 which are installed on the large plate 104. Clamping and clamping pressure between the stable mold 101 and the movable mold 102 are adjusted by means of hydraulic circuit 111 via hydraulic pipes 113 connected to four tie bars 105. The injection compression pressure after clamping the molds is applied by the hydraulic circuit 112 on the large plate 104 opposed to the movable mold 102.

Effort has been made to form optical disk substrates having a higher density with the above-mentioned molding machines.

However, it is difficult to form, for example, a polycarbonate resin substrate having an outside diameter of approximately 120 mm, a thickness of approximately 1.2 mm, a track pitch of approximately 1.0 $\mu$m and a pitch depth of approximately 110 nm, which specifications allow for satisfactory replicability.

Further, in order to achieve high density, the aperture of the objective lens should be enlarged in order to improve the diameter of the ray irradiated to a optical disk. In this case, the aberration of the inclination is in proportion to the substrate thickness and the cube of the aperture. Thus to control the pickup, the substrate should be thin. However, in order to form a thin substrate, it becomes necessary to cast a melted resin material into a narrower gap. This leads to problems such as difficulty in obtaining replication due to the tendency that the substrate can easily be cooled off, and worsened birefringence or warp due to increased stress.

In order to mold such thin substrates, it becomes necessary to fill a resin material into a narrower gap. Therefore there are problems such as difficulty in obtaining replication due to the tendency that the resin can easily be cooled off, resulting in the deteriorated birefringence or warp.

Since a resin material is filled into a narrower gap, a large velocity gradient is generated in the vicinity of the mold surface, thereby generating a shearing stress caused by the viscous friction between the solid layer formed by cooling-off by the contact with the mold wall and the fluid layer in the center part. As a result, the resin generates a molecular orientation and becomes solidified without relaxation of stress to have a residual stress therein. Further, the center part of the resin becomes solidified to have a residual stress while receiving a uniform pressure like a hydrostatic pressure. Since a specific atomic group in the polymer becomes oriented to a specific orientation by the stress, the birefringence is generated as a consequence.

Besides, since a residual stress is not homogeneous in the direction of the substrate surface nor symmetrical in the direction of the thickness, the warp is generated.

SUMMARY OF THE INVENTION

In order to solve the above-mentioned conventional problems, an object of the present invention is to provide a process and apparatus for making high density optical disk substrates having good substrate replicability and birefringence sufficient for practical use in a thin resin optical disk substrate having a thickness of less than 1 mm.

In order to achieve the above and other objects and advantages, a first embodiment of the process for producing disk substrates of the invention is an injection-compression molding method for optical disk substrates comprising the steps of injecting melted resin into a cavity formed between a pair of molds and narrowing the width of the cavity by compressing the molds, wherein the minimum cavity width is narrower than the desired substrate thickness by more than 0 mm and less than 0.1 mm, the maximum cavity width is wider than the minimum cavity width by more than 0.15 mm and less than 0.3 mm, and when a mold without a core pressing mechanism is used the initial clamping force is more than 0 to less than 10 tons, and when a mold with a core pressing mechanism is used the initial injection compression force is more than 0 ton and less than 10 tons.

In the above-mentioned first embodiment of the invention, it is preferable that at least one force selected from the group consisting of the initial mold clamping force and the initial injection compression force is applied in the range of 0 ton to 10 tons, and a force greater than the force is further applied.

A second embodiment of the process for producing optical disk substrates of the invention is an injection-compression method of molding optical disk substrates comprising the steps of injecting melted resin into a cavity formed between a pair of molds and narrowing the width of the cavity by compressing the molds, wherein the inflow port through which the melted resin is filled is closed and the compression process starts within the period between 0.1 second before and 0.3 second after the time at which the pressure of the resin filled in the cavity becomes minimum.

In the above-mentioned first and second embodiments, it is preferable that at least the mirror surface temperature of the mold in which the stamper is installed is lower than the glass transition temperature of the resin by more than 5K and less than 25K. Temperature can be adjusted by a means such as controlling the temperature of at least the cooling medium flowing in the cooling pipe of the mold having the stamper installed thereon.

In the above-mentioned first and second embodiments, it is preferable that a resin material is further dried before melting.

An apparatus for producing optical disk substrates of the invention is an injection-compression molding machine which forms disk substrates by means of injecting melted resin into a cavity formed between a pair of molds and narrowing the width of the cavity formed between the molds. The apparatus comprises an opening and closing means to open and close the pair of the molds, a heating means to melt the resin, an injection means to fill the melted resin into the cavity between the pair of the closed molds, a pressure maintenance means to prevent reflux of the resin in the cavity toward the inflow port, a compression means to further clamp the pair of the molds after filling, a means to detect the point of time at which the pressure of the resin filled in the cavity is at a minimum, wherein the inflow port through which the melted resin is filled into the cavity is closed or the compression operation is commenced in the period between 0 second and 0.3 second after the time at which the pressure of the resin becomes minimum.

In the above-mentioned embodiment, it is preferable to have a means to control at least the mirror surface temperature of the mold having the stamper installed thereon so that the mirror surface temperature is lower than the glass transition temperature of the resin by more than 5K and less than 25K at the time of filling the melted resin in the cavity formed between a pair of closed molds.

In the above-mentioned apparatus of the invention, it is preferable that a means to dry a resin material before melting is further installed.

The above-mentioned first or second production process of the invention provides a high density optical disk substrate comprising a thin resin substrate and having good replicability and a birefringence sufficient for the practical use as a disk. That is, since the molds are not completely closed so as to have a wider cavity width to facilitate the resin flow therein, and since the pressure from the molds to the melted resin is reduced as much as the substrate thickness can be controlled to decrease the stress generated in the melted resin at the time of filling in the melted resin into the cavity formed between a pair of closed molds, the birefringence of the molded resin substrate can be lowered.

Further, since the inflow port of the resin is closed around the time at which the stress on the melted resin filled in the cavity formed between a pair of closed molds becomes minimum to reduce the residual stress in the melted resin and the compression process is commenced before the resin solidifies, the replication and birefringence of the molded resin substrate can be improved. By adjusting the mirror surface temperature of the molds to be adequate, the replication and the birefringence can be improved as well.

By detecting the time at which the stress to the melted resin filled in the cavity formed between a pair of closed molds becomes minimum, which varies depending upon the molding conditions to start closing the inflow port of the melted resin and compression process, stable substrate replication and birefringence can always be obtained.

The apparatus for producing optical disk substrates of the invention reduces the stress on the resin and decreases the birefringence by filling the resin into the cavity with a specific cavity width and an injection-compression force. Further, good replication and birefringence reduction can be provided by having a specific mold temperature to facilitate the resin flow, by stopping the filling of the resin at the time at which the pressure of filling the resin becomes minimum and starting the compression process. Consequently, high quality disk substrates can be produced efficiently.

The apparatus for producing optical disks of the invention reduces the stress generated in the melted resin and reduces the birefringence in the molded resin substrate since the molds are not completely closed to have a wider cavity width to facilitate the resin flow therein and the pressure from the molds to the melted resin is reduced as much as the substrate thickness can be controlled to decrease the stress generated in the melted resin at the time of injecting the melted resin into the cavity between a pair of closed molds.

Further, since the inflow port of the resin is closed at around the time at which the stress on the melted resin filled in the cavity formed between a pair of closed molds becomes minimum to reduce the residual stress in the melted resin and the compression process is commenced before the resin solidifies, the replication and birefringence of the molded resin substrate can be improved. By adjusting the mirror surface temperature of the molds to be adequate, the replication and the birefringence can be improved as well.

By detecting the time at which the stress to the melted resin filled in the cavity formed between a pair of closed molds becomes minimum which varies depending upon the molding conditions and starting closing the inflow port of the melted resin and compression process based on the detected time, stable substrate replication and birefringence can always be accomplished.

By further having a means to dry a resin material before melting, deterioration of the molecular weight caused by the hydrolysis of the resin can be prevented.

DETAILED DESCRIPTION OF THE PREFERRED EMBODIMENTS

The invention will be further illustrated referring to Examples. The Examples are not intended to limit the invention in any way.

EXAMPLE 1

First, an injection-compression molding method with a toggle type molding machine will be described.

Figure 3:
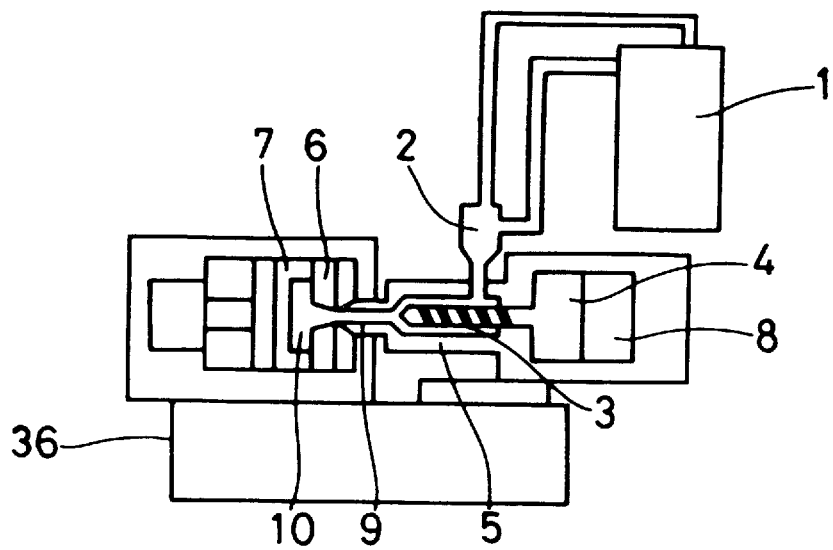
FIG. 3 is a section view illustrating the structure of the molding machine used in Examples 1 to 6 of the invention.

FIG. 3 is a diagram illustrating the structure of a molding machine of the invention. Numeral 1 denotes a material drying device for preventing molecular weight reduction caused by a resin absorbing moisture from the air and subsequent hydrolysis of the resin material. Commonly used resins include a polycarbonate resin, a poly(meth)acrylate resin (PMMA), a urethane resin and a polyester resin.

Preferable drying methods include a hot-air circulating drying method and a vacuum drying method. Preferable drying conditions in a hot-air circulating drying method with the example of a polycarbonate resin are that polycarbonate resin pellets are maintained in the temperature of 100° to 130° C. for 2 to 10 hours to be dried. As for a vacuum drying method, polycarbonate resin pellets are maintained in the temperature of 60° to 120° C. for 1 to 10 hours with a vacuum degree of 1 to 100 torr. It is preferable to obtain the water absorption rate of the polycarbonate resin pellets of 0.015 weight % or less. In the following Examples, a hot-air circulating drying method was employed and treated with the temperature of 120° C. for 6 hours. And consequently the water absorbing rate of 0.015 weight % was achieved.

The polycarbonate resin used in the following Examples have a melting point of 240° C. and the glass transition temperature of 150° C.

A resin material is supplied to the hopper 2 from the material drying device 1 by means of hot air. Pellets of a uniform size are generally used as the resin material. The resin material in the hopper 2 is conveyed to the screw 3. The resin material is heated by means of the heating cylinder 5 while rotating the screw 3 driven by the motor 4. In this process, the resin is melted and kneaded. Numeral 6 is the stationary mold and 7 is the movable mold. The stationary mold 6 and the movable mold 7 are fixed to the large plate with bolts. By means of opening and closing the molds, the movable mold 7 parts or interfits with the stationary mold 6. Numeral 36 is the base.

With the stationary mold 6 and the movable mold closed and a clamping pressure applied, the screw 3 is advanced without rotating by means of the hydraulic circuit 8. Then the melted resin material is injected into the cavity 10 via the nozzle 9 (injection process). Since the duration of the injection period is such a short time (less than 1 second), it is controlled by the position of the screw.

In order to prevent reflux of the resin material to the screw 3, pressure is applied to the screw 3 by means of the hydraulic circuit 8 when the resin material is filled in the cavity 10 (pressure maintenance process).

Figure 7A:
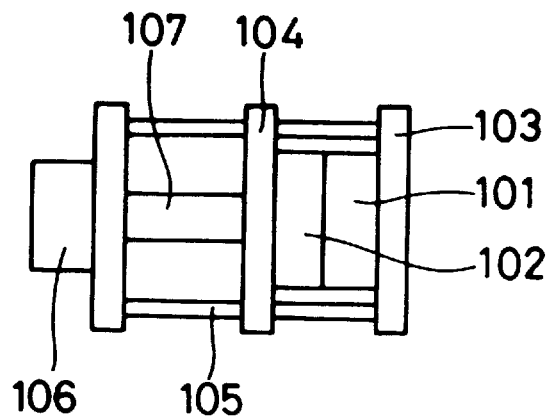
FIGS. 7(a) and 7(b) are plane views illustrating the outline of mechanical parts of conventional molding machines.
Figure 7B:
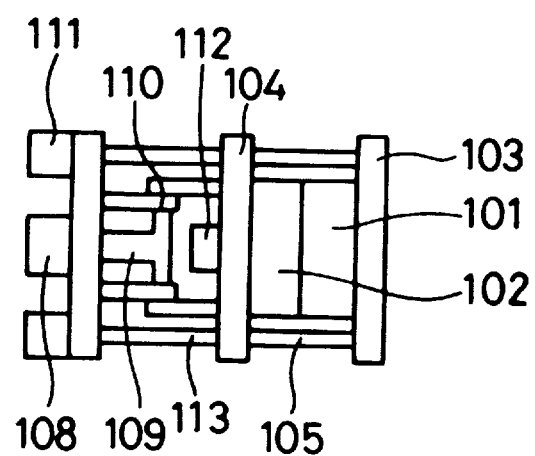

Then, with the movable mold 7 clamped to the stationary mold 6 by means of hydraulic circuit 111 via tie bars 105, the injection-compression pressure is applied to the core portion of the movable mold 7 by means of the hydraulic circuit 112 (see FIG. 7(b)) and maintained. This step comprise the compression process. The resin material is cooled off to the point lower than the glass transition temperature of the resin (i.e., a cooling process). The molded substrate is ejected after detaching the movable mold 7 from the stationary mold 6. The above-mentioned compression process and the cooling process can be conducted either independently or simultaneously.

Figure 1:
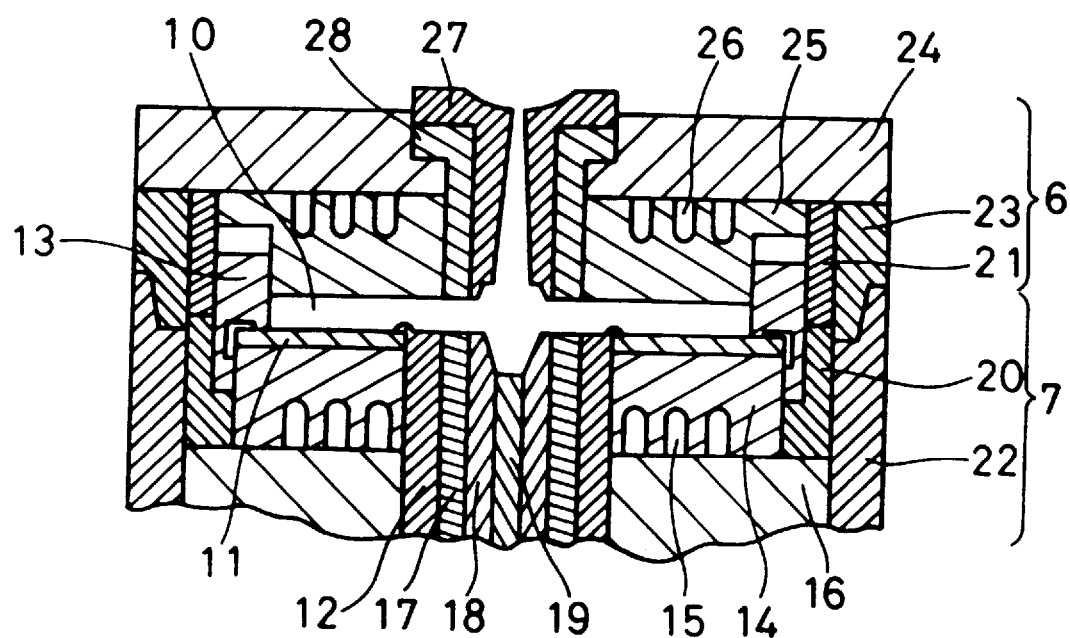
FIG. 1 is a section view of the mold used in Example 1, and Examples 4 to 6 in the invention.

The structure of the mold used in this Example is illustrated in FIG. 1. Ii this structure the stamper 11 is installed at the side of the movable mold 7. The stamper inner holder 12 is installed at the inside perimeter of the stamper 11, and the stamper outer holder 13 is installed at the outside perimeter of the stamper 11. The stamper outside holder 13 also determines the outside diameter of the molded substrate.

The stamper 11 is closely in contact with the movable mold mirror portion 14 in which cooling conduit 15 is installed to maintain a certain temperature by flowing cool water through it. The movable mold mirror portion 14 is integrated with the movable mold substrate 16 with bolts via O rings.

At the center of the movable mold 7 are the ejector punch 17, cut punch 18, and ejector pin 19. The cut punch 18 is used to form a hole at the center of the molded substrate. At the time of ejecting the substrate after molding, the ejector punch 17 and the ejector pin 19 used are to mechanically push off the substrate product and residual portion (sprue portion) to form a hole, respectively.

By contacting the stationary mold knock ring 21 at the outside perimeter of the stationary mold 6, the movable mold knock ring 20 at the outside perimeter of the movable mold 7 determines the minimum width of the cavity 10 formed between the molds. Further, the movable mold guide ring 22 at the outside perimeter of the movable mold knock ring 20 determines the maximum width of the cavity 10 formed between the molds by contacting to the stationary mold guide ring 23. That is, by the contact of the movable mold guide ring 22 and the stationary mold guide ring 23, clamping is conducted, and injection-compression is applied by further moving the core portion of the movable mold 7 to the point at which the movable mold knock ring 20 and the stationary mold knock ring 21 contact each other.

The stationary mold knock ring 21, the stationary mold guide ring 23 and the stationary mold mirror portion 25 are installed to the stationary mold substrate 24 of the stable mold 6. The cooling conduit 26 is installed in the stationary mold mirror portion 25 to maintain a specific temperature by the flow of cool water therethrough.

At the center of the stationary mold 6 is the sprue bush 27 via which the melted resin injected from the nozzle 9 (see FIG. 3) flows into the cavity 10. In order to facilitate the removal of resin in the sprue bush 27 portion after molding, the sprue bush 27 is cooled off to shrink and separate the solidified resin. At the perimeter of the sprue bush 27 is the stationary end bush 28 to provide insulation between the sprue bush 27 and the stationary end mold mirror portion 25.

To separate the molded substrate from the stamper 11, blown air is used in addition to the mechanical structure of the ejector punch 17, namely, the blow (or flow) of the compressed air is applied from the portion between the stamper inside holder 12 and the ejector punch 17 of the movable mold 7 side, and from the portion between the stationary mold mirror portion 25 and the stable end bush 28 of the stationary mold 6 side, respectively.

Table 1 illustrates the correspondence among the minimum cavity width (at room temperature with the desired substrate thickness as the standard), the controllable minimum substrate thickness (with the desired substrate thickness as the standard) and the maximum absolute value of birefringence of the desired substrate thickness. The maximum cavity width was determined to be thicker than the desired substrate thickness by 0.2 mm. The difference between the values of the maximum width and the minimum width of the cavity was defined as the compression margin. The outside diameter of the substrate was 120 mm and the desired substrate thickness was 0.6 mm. The signal area of the stamper 11 was a pit with a track pitch of 1.0 μm and a depth of 110 nm. A polycarbonate resin was used as the resin material. The resin temperature was 380° C. the mold temperature was 125° C., and the sprue temperature was 60° C. The clamping force was 40 tons. The injection-compression force at the time of filling in the melted resin was 4 tons and at the time of compression process after pressure maintenance was 20 tons. The molding cycle was 15 seconds.

The "birefringence" is a nature of light conducting through an anisotropic polymer, that is, a phenomenon of the emergence of two refracted rays from a ray incident to an anisotropic polymer. The birefringence was measured by the vertical incidence of a parallel ray of a helium neon gas laser and the value of the double path was measured.

TABLE 1

| minimum cavity width (with the desired substrate thickness as the standard) | controllable minimum substrate thickness (with the desired substrate thickness as the standard) | maximum absolute value of birefringence (desired substrate thickness) |
| --- | --- | --- |
| 0.05 mm | 0.03 mm | — |
| 0 mm | −0.02 mm | 38 nm |
| −0.05 mm | −0.07 mm | 41 nm |
| −0.1 mm | −0.12 mm | 50 nm |
| −0.15 mm | −0.17 mm | 128 nm |

Note:
a plus figure denotes that it is thicker than the desired substrate thickness.

From Table 1, it was learned that the birefringence becomes 50 nm or less when the minimum cavity width is thinner than the desired substrate thickness by 0.1 mm or less. The birefringence becomes larger if it is measured by the oblique incidence instead of the vertical incidence into the polycarbonate resin substrate of which birefringence measured 50 nm. By the incidence of 30°, the birefringence became approximately 100 nm. Further, since the ray irradiated into the optical disk was a convergence ray, a high density optical disk using a high aperture of 0.6 or more (even using a reproduction-only type) needs a birefringence of the vertical incidence of at least 50 nm. Moreover, since the width between the molds can be controlled in the opening direction to obtain a substrate of a desired thickness, the minimum cavity width cannot be thicker than the desired substrate thickness. Therefore it was learned that the minimum cavity width can be thinner than the desired substrate thickness by from 0 mm to 0.1 mm.

The minimum cavity width was thinner than the desired substrate thickness by 0.05 mm. The substrate outside diameter was 120 mm, and the desired substrate thickness was 0.6 mm. The signal area of the stamper 11 was a pit with track pitch of 1.0 μm and a depth of 110 nm. The resin material was a polycarbonate resin. The resin temperature was 380° C., the mold temperature was 125° C., and the sprue temperature was 60° C. The clamping force was 40 tons. The injection-compression force at the time of filling in the melted resin was 4 tons and at the time of compression process after pressure maintenance was 20 tons. The molding cycle was 15 seconds. The birefringence was measured by the vertical incidence of parallel ray of a helium neon gas laser and the value of double path was measured. The results are shown in Table 2.

TABLE 2

| compression margin | maximum absolute value of birefringence (desired substrate thickness) | shot variation of substrate thickness (including variation within substrate) |
| --- | --- | --- |
| 0.1 mm | 75 nm | ±25 μm |
| 0.15 mm | 49 nm | ±27 μm |
| 0.2 mm | 41 nm | ±30 μm |
| 0.25 mm | 42 nm | ±33 μm |
| 0.3 mm | 38 nm | ±35 μm |
| 0.35 mm | 36 nm | ±42 μm |
| 0.4 mm | 35 nm | ±51 μm |

Table 2 shows that the compression margin becomes greater, the birefringence becomes increasingly better, and the shot variation of the substrate thickness becomes greater. That is because the melted resin flow was facilitated by widening of the cavity 10 width at the time of filling the melted resin into the cavity 10, whereas the molds needed to move in a larger distance to be closed at cooling off the resin to adjust the thickness of the substrate as the compression margin became greater.

Table 2 also shows that the absolute value of the birefringence became 50 nm or less when the compression margin was 0.15 mm or more, and the shot variation of the substrate thickness became ±35 μm or less when the compression margin was 0.3 μm or less. If the substrate thickness variation exceeds ±35 μm, aberration becomes great enough to affect the signal reading. Therefore, the standard of the substrate thickness herein was determined to be ±35 μm. The standard of the birefringence of 50 nm was determined as explained in Table 1.

From Table 2, it was demonstrated that the preferable compression margin, namely, the difference between the maximum cavity width and the minimum cavity width was in the range of from 0.15 mm to 0.3 mm.

The relationship between the injection-compression force at the time of filling the melted resin and the birefringence is shown in Table 3. The minimum cavity width was determined to be thinner than the desired substrate thickness by 0.05 mm, and the compression margin was determined to be 0.2 mm. The substrate outside diameter was 120 mm, and the desired substrate thickness was 0.6 mm. The signal area of the stamper 11 was a pit with track pitch of 1.0 μm and a depth of 110 nm. A polycarbonate resin was used as the resin material. The resin temperature was 380° C., the mold temperature was 125° C., and the sprue temperature was 60° C. The clamping force was 40 tons. The injection-compression force at the time of compression process after pressure maintenance was 20 tons. The molding cycle was 15 seconds. The birefringence was measured by the vertical incidence of parallel ray of a helium neon gas laser, and the value of double path was measured.

TABLE 3

| injection-compression force (at the time of filling in the resin) | maximum absolute value of birefringence (desired substrate thickness) |
|---|---|
| 0 ton | 40 nm |
| 4 tons | 41 nm |
| 8 tons | 47 nm |
| 10 tons | 50 nm |
| 15 tons | 73 nm |
| 20 tons | 109 nm |

Table 3 demonstrates that the absolute value of the birefringence becomes 50 nm or less when the injection-compression force at the time of filling in the resin is 10 tons or less. In this case, since the width of cavity 10 before filling the melted resin into the cavity 10 was minimum due to the injection-compression force but the width of cavity 10 became maximum after filling the melted resin into the cavity 10 due to the resin pressure larger than the injection-compression force, consequently the resin flow was facilitated to reduce the stress on the resin and improve birefringence.

EXAMPLE 2

This Example illustrates the application of the invention to a straight hydraulic type molding machine. As FIG. 7(b) illustrates, in a toggle type molding machine, opening and closing the mold, clamping the mold and injection-compression are driven by the hydraulic circuit 108, the hydraulic circuit 111 and the hydraulic circuit 112, independently. On the other hand, as FIG. 7(a) illustrates, in a straight hydraulic type molding machine, opening and closing the mold, clamping the mold and injection-compression are conducted by the hydraulic circuit 106, collectively.

Figure 2:
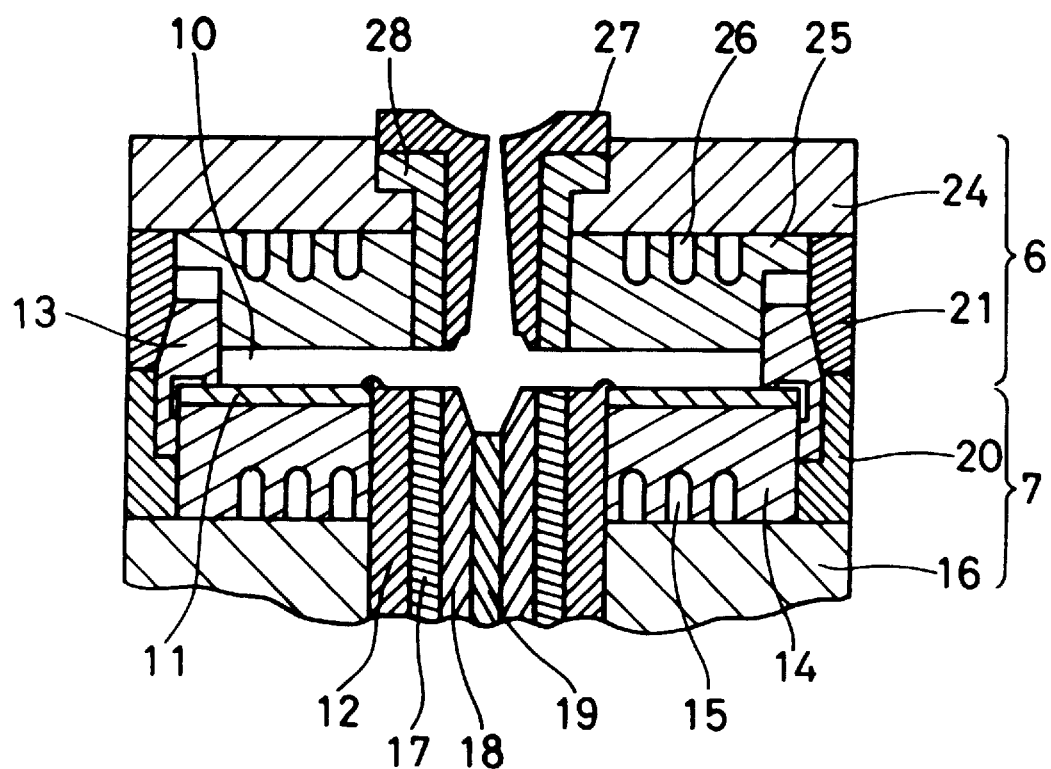
FIG. 2 is a section view of the mold used in Examples 2 to 4 and Example 6 in the invention.

The mold structure of this Example is illustrated in FIG. 2. Compared with the method of moving the core portion as described in FIG. 1, the mold does not have a stationary mold guide ring 23 and a movable mold guide ring 22. The mold of FIG. 1 determines the minimum cavity width and the maximum cavity width, whereas the mold of FIG. 2 determines only the minimum cavity width.

The correspondence among the minimum cavity width (at room temperature, with the desired substrate thickness as the standard), the controllable minimum substrate thickness (with the desired substrate thickness as the standard) and the maximum absolute value of birefringence (desired substrate thickness) are shown in Table 4. The maximum cavity width was determined to be thicker than the desired substrate thickness by 0.2 mm. The outside diameter of the substrate was 120 mm, and the desired substrate thickness was 0.6 mm. The signal area of the stamper 11 was a pit with a track pitch of 1.0 μm and a depth of 110 nm. A polycarbonate resin was used as the resin material. The resin temperature was 380° C., the mold temperature was 125° C., and the sprue temperature was 60° C. The first clamping force was 4 tons, and the second clamping force was 20 tons. The molding cycle was 15 seconds. The birefringence was measured by the vertical incidence of a parallel ray of a helium neon gas laser and the value of the double path was measured.

TABLE 4

| minimum cavity width (with the desired substrate thickness as the standard) | controllable minimum substrate thickness (with the desired substrate thickness as the standard) | maximum absolute value of birefringence (desired substrate thickness) |
|---|---|---|
| 0.05 mm | 0.03 mm | — |
| 0 mm | −0.02 mm | 38 nm |
| −0.05 mm | −0.07 mm | 42 nm |
| −0.1 mm | −0.12 mm | 49 nm |
| −0.15 mm | −0.17 mm | 107 nm |

Note:
a plus figure denotes that it is thicker than the desired substrate thickness.

Table 4 demonstrates that the birefringence becomes 50 nm or less when the minimum cavity width is thinner than the desired substrate thickness by 0.1 mm or less. In addition, in order to achieve the desired substrate thickness, the minimum cavity width cannot be thicker than the desired substrate thickness since the molds can be controlled only to the direction of opening. Thus it was proven that the preferable minimum cavity width is thicker than the desired substrate thickness in the range of from 0 mm and 0.1 mm.

Next the maximum cavity width will be discussed. The minimum cavity width was determined to be thinner than the desired substrate thickness by 0.05 mm. The opening degree of the molds was measured with a laser displacement meter. The outside diameter of the substrate was 120 mm and the desired substrate thickness was 0.6 mm. The signal area of the stamper 11 was a pit a with track pitch of 1.0 μm and a depth of 110 nm. A polycarbonate resin was used as the resin material. The resin temperature was 380° C., the mold temperature was 125° C. and the sprue temperature was 60° C. The first clamping force was 4 tons and the second clamping force was 20 tons. The molding cycle was 15 seconds. The birefringence was measured by the vertical incidence of a parallel ray of a helium neon gas laser and the value of the double path was measured. And the measured result is shown in Table 5.

TABLE 5

| compression margin | maximum absolute value of birefringence (desired substrate thickness) | shot variation of substrate thickness (including variation within substrate) |
|---|---|---|
| 0.1 mm | 69 nm | ±23 μm |
| 0.15 mm | 47 nm | ±26 μm |
| 0.2 mm | 42 nm | ±31 μm |
| 0.25 mm | 41 nm | ±33 μm |
| 0.3 mm | 38 nm | ±35 μm |
| 0.35 mm | 33 nm | ±43 μm |
| 0.4 mm | 31 nm | ±55 μm |

Table 5 demonstrates that as the compression margin becomes greater, the birefringence becomes better, and the shot variation of the substrate thickness becomes greater.

Table 5 further shows that the absolute value of birefringence became 50 nm or less when the compression margin was 0.15 mm or more, and the shot variation of the substrate thickness becomes ±35 μm or less when the compression margin was 0.3 μm or less. Consequently it was learned that the preferable compression margin, namely, the difference between the maximum cavity width, and the minimum cavity width is in the range of from 0.15 mm to 0.3 mm.

The relation between the first injection compression force at the time of filling the melted resin and the birefringence is illustrated in Table 6. The minimum cavity width was determined to be thinner than the desired substrate thickness by 0.05 mm, and the compression margin was determined to be 0.2 mm. The substrate outside diameter was 120 mm, and the desired substrate thickness was 0.6 mm. The signal area of the stamper 11 was a pit with a track pitch of 1.0 μm and a depth of 110 nm. A polycarbonate resin was used as the resin material. The resin temperature was 380° C., the mold temperature was 125° C. and the sprue temperature was 60° C. The second clamping force was 20 tons. The molding cycle was 15 seconds. The birefringence was measured by the vertical incidence of a parallel ray of a helium neon gas laser and the value of the double path was measured.

TABLE 6

| first clamping force | maximum absolute value of birefringence (desired substrate thickness) |
| --- | --- |
| 0 ton | 35 nm |
| 4 tons | 42 nm |
| 8 tons | 46 nm |
| 10 tons | 50 nm |
| 15 tons | 81 nm |
| 20 tons | 111 nm |

Table 6 demonstrates that the absolute value of the birefringence becomes 50 nm or less when the first clamping force is 10 tons or less. In this case, since the pressure of the melted resin filled in the cavity 10 became greater to widen the width of the cavity 10, consequently the resin flow was facilitated to reduce the stress to the resin and improve the birefringence.

In this Example use of a straight hydraulic molding machine was illustrated but the same operation can be conducted with the mold of FIG. 2 in a toggle type molding machine as well. When a toggle type molding machine was used, the injection-compression structure to move the core portion as illustrated in Example 1 is not used and clamping was conducted only with a clamping structure. However, similar results were observed with a toggle type molding machine as the straight hydraulic molding machine under the same molding conditions.

EXAMPLE 3

In Example 1 and Example 2, the force to compress the cavity 10 was applied in two stages, namely, with a smaller first force and a greater second force. In this Example, the use of a one stage force to compress the cavity 10 applied is illustrated. The mold with the structure of FIG. 2 was used in a straight hydraulic molding machine.

The correspondence among the minimum cavity width (at room temperature, with the desired substrate thickness as the standard), the controllable minimum substrate thickness (with the desired substrate thickness as the standard) and the maximum absolute value of birefringence is illustrated in Table 7. The maximum cavity width was determined to be thicker than the desired substrate thickness by 0.2 mm. The outside diameter of the substrate was 120 mm and the desired substrate thickness was 0.6 mm. The signal area of the stamper 11 was a pit with a track pitch of 1.0 μm and a depth of 110 nm. A polycarbonate resin was used as the resin material. The resin temperature was 380° C., the mold temperature was 130° C. and the sprue temperature was 60° C. The clamping force was 8 tons. The molding cycle was 15 seconds. The birefringence was measured by the vertical incidence of a parallel ray of a helium neon gas laser and the value of the double path was measured.

TABLE 7

| minimum cavity width (with the desired substrate thickness as the standard) | controllable minimum substrate thickness (with the desired substrate thickness as the standard) | maximum absolute value of birefringence (desired substrate thickness) |
| --- | --- | --- |
| 0.05 mm | 0.03 mm | — |
| 0 mm | −0.02 mm | 44 nm |
| −0.05 mm | −0.07 mm | 47 nm |
| −0.1 mm | −0.12 mm | 50 nm |
| −0.15 mm | −0.17 mm | 105 nm |

Note:
a plus figure denotes that it is thicker than the desired substrate thickness.

It was learned from Table 7 that the birefringence becomes 50 nm or less when the minimum cavity width is thinner than the desired substrate thickness by 0.1 mm or less. In addition, since the molds can be controlled only in the direction of opening to achieve the desired substrate thickness, the minimum cavity width cannot be thicker than the desired substrate thickness. Thus, it was learned that the preferable minimum cavity width is thicker than the desired substrate thickness in the range of from 0 mm and 0.1 mm.

Next the maximum cavity width will be discussed. The minimum cavity width was determined to be thinner than the desired substrate thickness by 0.05 mm. The opening degree of the molds was measured with a laser displacement meter. The outside diameter of the substrate was 120 mm, and the desired substrate thickness was 0.6 mm. The signal area of the stamper 11 was a pit with a track pitch of 1.0 μm and a depth of 110 nm. A polycarbonate resin was used as the resin material. The resin temperature was 380° C., the mold temperature was 130° C. and the sprue temperature was 60° C. The clamping force was 8 tons. The molding cycle was 15 seconds. The birefringence was measured by the vertical incidence of a parallel ray of a helium neon gas laser and the value of the double path was measured. The results are shown in Table 8.

TABLE 8

| compression margin | maximum absolute value of birefringence (desired substrate thickness) | shot variation of substrate thickness (including variation within substrate) |
| --- | --- | --- |
| 0.1 mm | 72 nm | ±29 μm |
| 0.15 mm | 50 nm | ±31 μm |
| 0.2 mm | 47 nm | ±33 μm |
| 0.25 mm | 44 nm | ±33 μm |
| 0.3 mm | 40 nm | ±35 μm |
| 0.35 mm | 36 nm | ±45 μm |
| 0.4 mm | 32 nm | ±57 μm |

Table 8 demonstrates that as the compression margin becomes greater, the birefringence becomes better, and the shot variation of the substrate thickness becomes greater.

Table 8 also shows that the absolute value of birefringence became 50 nm or less when the compression margin was 0.15 mm or more, and the shot variation of the substrate thickness became ±35 μm or less when the compression margin was 0.3 μm or less. Consequently it was learned that the preferable compression margin, namely, the difference between the maximum cavity width and the minimum cavity width was in the range of from 0.15 mm to 0.3 mm.

The relation among the clamping force at the time of filling the melted resin, the birefringence and the substrate thickness is illustrated in Table 9. The minimum cavity width was determined to be thinner than the desired substrate thickness by 0.05 mm, and the compression margin was determined to be 0.2 mm. The substrate outside diameter was 120 mm, and the desired substrate thickness was 0.6 mm. The signal area of the stamper 11 was a pit with a track pitch of 1.0 μm and a depth of 110 nm. A polycarbonate resin was used as the resin material. The resin temperature was 380° C., the mold temperature was 130° C. and the sprue temperature was 60° C. The second clamping force was 20 tons. The molding cycle was 15 seconds. The birefringence was measured by the vertical incidence of a parallel ray of a helium neon gas laser and the value of the double path was measured.

TABLE 9

| clamping force | maximum absolute value of birefringence (desired substrate thickness) | shot variation of substrate thickness (including variation within substrate) |
| --- | --- | --- |
| 2 tons | 35 nm | ±42 nm |
| 4 tons | 42 nm | ±39 nm |
| 6 tons | 44 nm | ±35 nm |
| 8 tons | 47 nm | ±33 nm |
| 10 tons | 50 nm | ±32 nm |
| 15 tons | 75 nm | ±30 nm |

It was learned from Table 9 that the absolute value of the birefringence becomes 50 nm or less when the clamping force is 10 tons or less. In this case, since the pressure of the melted resin filled in the cavity 10 became greater to widen the width of the cavity 10, consequently the resin flow was facilitated to reduce the stress to the resin and improve the birefringence. Further, the shot variation of the substrate thickness became ±35 μm or less when the clamping force was 6 tons or more. This is because the maximum cavity width became thinner as the clamping force became greater and the moving distance of the surface of the cavity at the time of cooling off reduced. Therefore it was learned that the preferable clamping force when applied in one stage is in the range of from 6 tons to 10 tons.

In this Example, the use of a straight hydraulic molding machine was illustrated. However, the same operation can be conducted with a toggle type molding machine as well. When a toggle type molding machine was used, the injection-compression structure to move the core portion as illustrated in Example 1 is not used, and clamping was conducted only with a clamping structure. Similar results were observed with a toggle type molding machine as the straight hydraulic molding machine under the same molding conditions.

EXAMPLE 4

When a substrate was molded from a polycarbonate resin with an outside diameter of 120 mm, a thickness of 0.6 mm, the signal area of the stamper 11 was a pit with a track pitch of 1.0 μm and a depth of 110 nm in the production process of Examples 1 to 3, the absolute value of birefringence of 50 nm or less could be achieved at the mold temperature of 120° C. or more under the condition that the resin temperature was 380° C. In this case, the pit could be replicated sufficiently.

Then molding of substrates having higher density signal portion was further discussed. The signal area of the stamper 11 was a pit with track pitch of 0.6 μm and the depth of 110 nm.

Using the molding processes of Example 1 and Example 2, the obtained pit depth was 70 nms and the maximum absolute value of birefringence was in 80 nms. First, a toggle type molding machine will be discussed.

The increase of the injection compression force for improving replication in the mold of FIG. 1 resulted in distortion of the resin in the cavity 10 to enlarge the absolute value of birefringence. The increase of the clamping force in the mold of FIG. 2 resulted in enlarging the absolute value of birefringence. Table 10 shows the result of measuring the change of the pit depth according to the change of mold temperature and sprue temperature which is included in molding conditions of having the absolute value of birefringence of 50 nm or less. Temperature of the both molds, the stationary mold 6, and the movable mold 7 were controlled to be the same. The resin temperature was fixed to be 380° C. which is regarded as the upper limit in consideration of the decomposition initiating temperature of the polycarbonate. The molding cycle was 15 seconds.

TABLE 10

| mold temperature | sprue temperature | pit depth |
| --- | --- | --- |
| 125° C. | 60° C. | 71 nm |
| 125° C. | 80° C. | 76 nm |
| 125° C. | 100° C. | 80 nm |
| 130° C. | 60° C. | 108 nm |
| 135° C. | 60° C. | 109 nm |
| 140° C. | 60° C. | 107 nm |
| 145° C. | 60° C. | 110 nm |

Table 10 shows that a mold temperature of 130° C. is sufficient for replicating a track pitch of 0.6 μm, and a pit depth of 110 nm. However, since a substrate molded with the mold temperature of 145° C. had a propeller-like warp shape, it was determined that this can not be applied to an optical disk substrate. It was also observed that sprue temperature has a little influence on disk substrate quality.

In general, "mold temperature" refers to the temperature to control the medium flowing in the mold. However, the temperature of the cavity 10 to which the melted resin is filled into is virtually essential in molding operation. Then the mirror surface temperature in the vicinity of the surface of the cavity 10, which fluctuates in a cycle of molding, was measured to determine the temperature at the time the melted resin was injected. This temperature is defined to be the "mold mirror surface temperature" herein. The mold mirror surface temperature. when the mold temperature was 145° C., and the substrate had a propeller-like warp shape, was 15020 C., or the glass transition temperature of polycarbonate. Consequently it was learned that the mold mirror surface temperature should be lower than the glass transition temperature of the resin material, preferably lower by 5° C. or more. The mold mirror surface temperature at the time of the mold temperature of 130° C. was 135° C.

Table 11 shows the result of measuring the change of the pit depth according to the change of the stationary mold 6 temperature with the temperature of the movable mold 7 in which the stamper 11 was installed remained unchanged at 135° C. The sprue temperature was 60° C.

TABLE 11

| stable mold temperature | pit depth |
| --- | --- |
| 110° C. | 110 nm |
| 120° C. | 107 nm |
| 130° C. | 108 nm |
| 135° C. | 109 nm |
| 140° C. | 109 nm |

It was observed from the results that the temperature of the mold not having the stamper installed therein did not affect replication.

Therefore if the temperature of the mold having the stamper installed therein is 130° C. or more, a pit with a 0.6 μm track pitch and 110 nm depth can be replicated well.

From the above Example, it was observed that in order to have a product by molding a substrate with an outside diameter of 120 mm, and a depth of 6 mm that is preferable for practical use, at least the mold mirror surface temperature of the mold having the stamper installed therein should be lower than the glass transition temperature of the resin material by from 5K to 25K, preferably in the range of by from 5K to 15K.

Herein the case with the molding cycle fixed at 15 seconds will be discussed. With a shorter molding cycle, the mirror surface temperature becomes higher even if the mold temperature remains unchanged. Thus the relationship among the mold mirror surface temperature, replication and birefringence when the molding cycle changes, namely, 15 seconds, 12 seconds, 8 seconds was examined. It was observed that the mold mirror surface temperature which enables a sufficient replication and a birefringence of 50 nm or less was independent from the molding cycle.

It was also learned that when the mold of FIG. 2 was used in a straight hydraulic type molding machine, the same result was found as the case when the mold of FIG. 1 or FIG. 2 was used in a toggle type molding machine. That is, in order to have a product sufficient for practical use by molding a substrate with an outside diameter of 120 mm, depth of 0.6 mm, at least the mold mirror surface temperature of the mold having the stamper installed therein should be lower than the glass transition temperature of the resin material by from 5K to 25K, preferably in the range of by from 5K to 15K.

EXAMPLE 5

Figure 4:
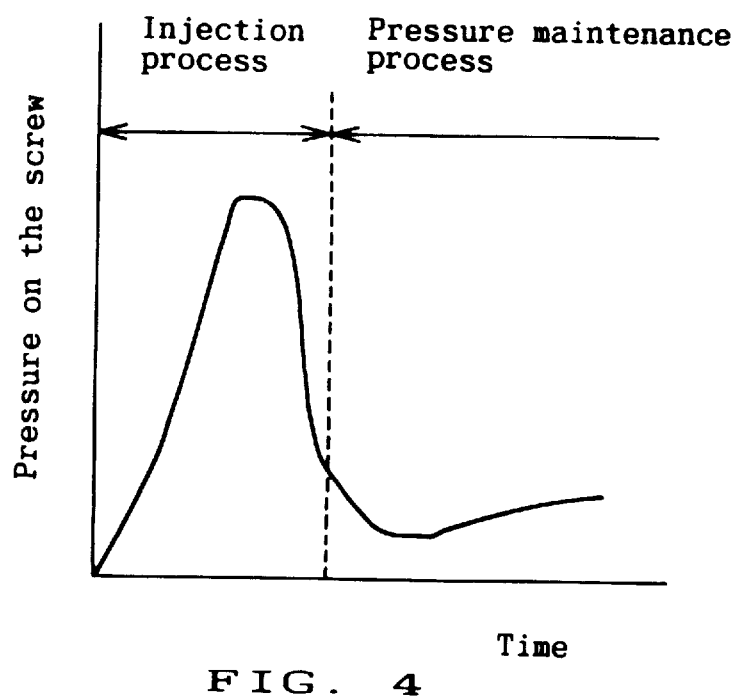
FIG. 4 is a graph illustrating the hourly variation of the stress applied to the screw used in Example 5 of the invention.

The relationship between the pressure on the melted resin and the birefringence was examined. In this Example the mold of FIG. 1 with a toggle type molding machine is illustrated. Since the pressure on the melted resin cannot be detected directly, the pressure on the screw, namely the reaction force of the melted resin was detected instead by means of a pressure gauge installed in the hydraulic circuit 8 of FIG. 3. In this case, detected pressure showed an hourly change as shown in FIG. 4, which illustrates the peak pressure in the injection process, the minimum value at the early stage of pressure maintenance process, followed by a gradual increase. The peak pressure was due to filling of the melted resin after the cavity 10 became full, the minimum value in the pressure maintenance process was due to the reflux of the melted resin which was not accommodated in the cavity 10 toward the sprue bush 27, nozzle 9, screw 3 and counteracted the melted resin pushed forward by the screw 3. The gradual increase of the resin pressure then was due to the pressure maintenance.

Based on the pressure change of FIG. 4, filling of the melted resin into the cavity 10 was terminated in the vicinity of the time at which the pressure of the melted resin becomes minimum. The cut punch 18 of FIG. 1 was projected. The injection compression force was increased from 4 tons to 20 tons almost at the same time as the termination of the cut punch 18 projection. In other words, the compression process was started, and the results are shown in Table 12.

The outside diameter of the substrate was 120 mm, and the desired substrate thickness was 0.6 mm. The minimum cavity width was thinner than the desired substrate thickness by 0.5 mm, and the compression margin was 0.2 mm. The signal area of the stamper 11 was a pit with a track pitch of 0.6 μm and a depth of 110 nm. A polycarbonate resin was used as the resin material. The resin temperature was 380° C., the mold temperature was 135° C., and the sprue temperature was 60° C. The clamping force was 40 tons. The molding cycle was 15 seconds. The birefringence was measured by the vertical incidence of a parallel ray of a helium neon gas laser and the value of the double path was measured.

TABLE 12

| time | absolute value of birefringence |
| --- | --- |
| −0.15 sec | 48 nm |
| −0.1 sec | 45 nm |
| 0 sec | 31 nm |
| 0.1 sec | 39 nm |
| 0.2 sec | 45 nm |
| 0.3 sec | 49 nm |
| 0.4 sec | 66 nm |

Note:
time is based on the minimum time of the melted resin pressure as the standard.

Table 12 shows that the absolute value of birefringence becomes 50 nm or less in the period prior to the point 0.3 second after the time at which the pressure on the melted resin becomes minimum.

It is preferable that the compression process starts at the same time as or prior to the termination of filling the melted resin into the cavity 10. This is because the pressure on the resin in the cavity 10 is relaxed by the commencement of the compression process. If it starts at or prior to 0.15 second after the point at which the stress on the melted resin becomes minimum, the variation of substrate thickness widened to ±50 μm or more. Therefore, it is preferable to close the inflow port for filling the melted resin or to start the compression process in the period from 0.1 second before to 0.3 second after the time at which the pressure on the melted resin becomes minimum.

In this Example a toggle type molding machine was used. However, the same operation was conducted with a straight hydraulic type molding machine applying a first clamping force of 4 tons and a second clamping force of 20 tons while the other conditions were kept the same, and similar results were obtained. Although a polycarbonate resin was used in Examples 1 to 5, other types of resins can be used as well.

EXAMPLE 6

The relationship between the pressure on the resin in the cavity 10 and the birefringence was examined in Example 5. The time at which the pressure on the melted resin in the cavity 10 becomes minimum varies according to the type of the molding machine, or molding conditions. Thus, the apparatus for producing disk substrates of the invention was designed to operate by detecting the time at which the pressure on the melted resin in the cavity 10 becomes minimum, and closing the inflow port for injecting the melted resin or starting the compression process in the period from 0.1 second before to 0.3 second after the point at which the pressure on the melted resin becomes minimum.

Figure 5A:
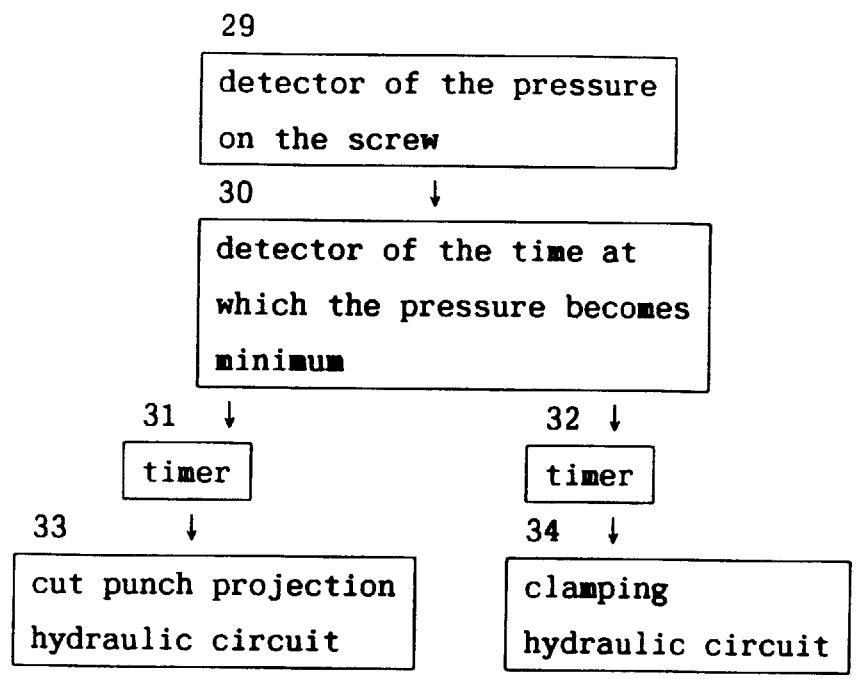
FIGS. 5(a) and 5(b) are charts illustrating the function of the invention with the molding machine used in Example 6 of the invention.
Figure 5B:
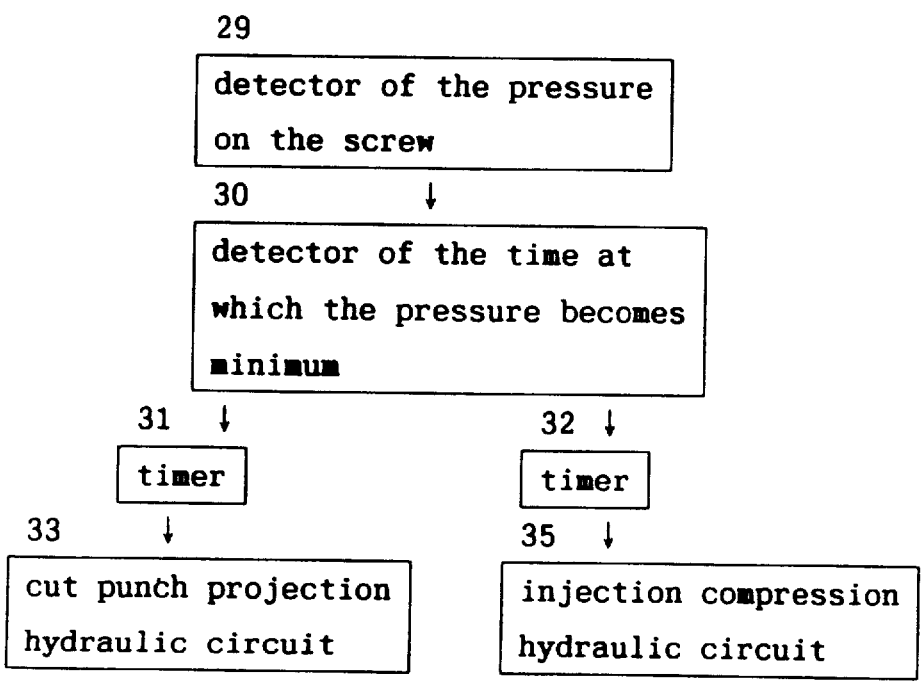
Figure 6A:
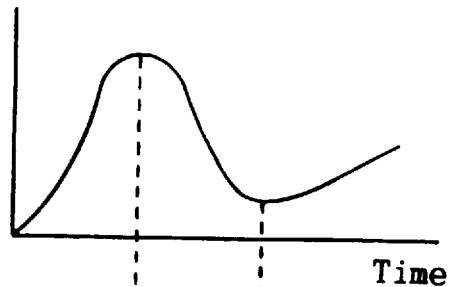
FIGS. 6(a) to 6(e) are graphs illustrating the signal processing with the detector of the pressure on the screw and the detector of the time at which the pressure becomes minimum of the molding machine described in Example 6 of the invention.
Figure 6B:
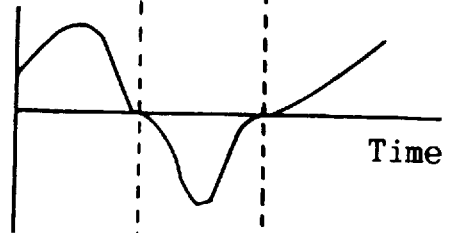
Figure 6C:
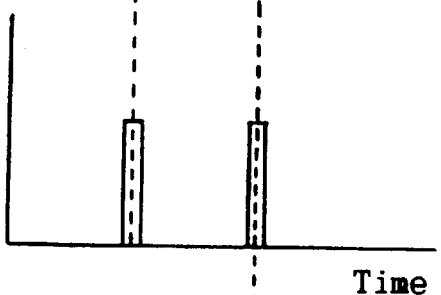
Figure 6D:
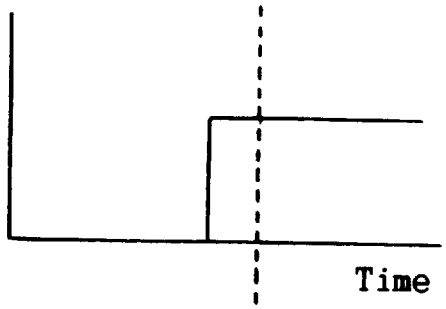
Figure 6E:
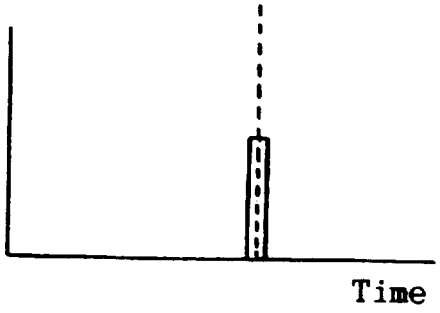

The structure of the apparatus of the invention is illustrated in FIG. 5. The hourly change of the pressure in the cavity 10 was detected by the detector of the pressure on the screw 29 and converted into voltage change. The voltage information from the detector of the pressure on the screw 29 was differentiated to determine the first zero crossing time in the pressure maintenance process.

The process of detecting the zero crossing time is illustrated in FIGS. 6(a) to 6(e). The signal (a) is the output from the detector of the pressure on the screw 29. The signal (b) is the differential signal of the signal (a). The signal (c) is the pulse detected when the signal (b) crosses zero. The signal (d) is a gate signal showing a plus value after the pressure maintenance process. The signal (e) is the product of the signal (c) and (d), illustrating the time at which the signal (b) crosses zero for the first time in the pressure maintenance process. The processing from the signal (b) to the signal (e) is conducted by the detector of the time at which the pressure becomes minimum 30.

Then, with the minimum pressure time as the starting point, the timer 31 and the timer 32 were set to start operation of the cut punch projection hydraulic circuit 33 and the clamping hydraulic circuit 34 after a specific period so that the cut punch was projected and the first clamping was converted to the second clamping when a mold without a core pushing mechanism as illustrated in FIG. 2 was used. When a mold with a core pushing mechanism as illustrated in FIG. 1 was used, the timer 31 and the timer 32 were set to start operation of the cut punch projection hydraulic circuit 33 and the injection compression hydraulic circuit 35 after a specific period so that the cut punch was projected, and the injection compression force was reinforced to the higher pressure. The specific period set by the timer 31 and the timer 32 was in the range of from 0 second to 0.3 second, and it was preferable that the duration set by the timer 32 was the same as or shorter than the duration set by the timer 31. As a result of this operation, a result similar to Example 5 was obtained.

The overall structure of the production machine of disk substrates of the invention comprises an opening and closing means to open and close a pair of molds, a heating means to melt the resin, an injection means to fill the melted resin into the cavity between the pair of the closed molds, a pressure maintenance means to prevent reflux of the resin in the cavity toward the inflow port, a compression means to further clamp the pair of the molds after filling, a means to detect the time at which the pressure of the resin filled in the cavity becomes minimum, wherein the inflow port through which the melted resin is filled into the cavity is closed or the compression operation is commenced in the period between 0 second and 0.3 second after the time at which the pressure of the resin becomes minimum.

What is claimed is:

1. An apparatus for producing an optical disk substrate by injecting molten resin into a cavity having an inflow port formed between a pair of molds, at least one of the molds having a stamper therein, and narrowing a width of the cavity formed between the molds, comprising opening and closing means to open and close the pair of the molds, heating means to melt the resin, injection means to fill the molten resin into the cavity between the pair of closed molds, pressure maintenance means to prevent reflux of the resin in the cavity toward the inflow port, compression means to further clamp the pair of the molds after filling, means to detect a point in time at which a pressure of the resin filled in the cavity is at a minimum, wherein within 0.3 second from the point at which the pressure of the resin is at a minimum at least one operation selected from the group consisting of closing the inflow port through which the molten resin is filled into the cavity and starting the compression operation is conducted.

2. The apparatus for producing an optical disk substrate according to claim 1, further comprising means to control a mirror surface temperature of at least the mold having the stamper installed therein to be lower than the glass transition temperature of the resin material by more than 5K and less than 25K.

3. The apparatus for producing an optical disk substrate according to claim 1, further comprising means to monitor a pressure on a screw in the pressure maintenance means after injecting molten resin, and means for detecting a first zero crossing time of information obtained by differentiating the monitored pressures on the screw, and when a mold without a core pushing mechanism is used, starting operation of a cut punch projection hydraulic circuit and a clamping hydraulic circuit after a specific time to project the cut punch and convert the injection compression force from low pressure to high pressure.

4. The apparatus for producting an optical disk substrate according to claim 1, further comprising means to monitor a pressure on a screw in the pressure maintenance means after injecting molten resin, and means for detecting a first zero crossing time of information obtained by differentiating the monitored pressures on the screw, and when a mold with a core pushing mechanism is used, starting operation of a cut punch projection hydraulic circuit and a injection compression hydraulic circuit after a specific time to project the cut punch and convert the injection compression force from low pressure to high pressure.

5. The apparatus for producing an optical disk substrate according to claim 1, further comprising means to dry a resin material.

* * * * *